United States Patent [19]

Soum et al.

[11] Patent Number: 4,616,388

[45] Date of Patent: Oct. 14, 1986

[54] PROCESS FOR PRODUCING A HYDRODYNAMIC BEARING HAVING INTERNAL FOIL CARTRIDGE

[75] Inventors: Jacques Soum; Christian Malabre, both of Paris, France

[73] Assignee: ABG Semca, Paris, France

[21] Appl. No.: 496,824

[22] Filed: May 23, 1983

[30] Foreign Application Priority Data

May 27, 1982 [FR] France .................. 82 09476

[51] Int. Cl.$^4$ ............................................. B21D 53/10
[52] U.S. Cl. ........................ 29/149.5 S; 29/149.5 C; 29/148.4 R; 384/101; 384/103
[58] Field of Search ............... 384/101, 102, 103, 104, 384/105, 106; 29/149.5 R, 148.4 R, 149.5 C, 149.5 S

[56] References Cited

U.S. PATENT DOCUMENTS

| | | | |
|---|---|---|---|
| 3,382,014 | 5/1968 | Marley | 384/106 |
| 4,005,914 | 2/1977 | Newman | 384/103 |
| 4,195,395 | 4/1980 | Silver et al. | 29/149.5 S |
| 4,229,054 | 10/1980 | Miller, Jr. | 384/106 |

FOREIGN PATENT DOCUMENTS 756099  8/1980  U.S.S.R. .................. 384/103

*Primary Examiner*—Howard N. Goldberg
*Assistant Examiner*—P. W. Echols
*Attorney, Agent, or Firm*—Roland Plottel

[57] ABSTRACT

The invention provides a process for producing hydrodynamic bearings for supporting and guiding rotary machine shafts. The process consists of pre-manufacturing a self-contained cartridge formed of thin foils, each fixed to its two next adjacent foils at locations staggered along said foils at overlapping parts thereof, so as to form an internal floating surface adapted to generate the formation of a fluid film between this surface and a shaft mounted therein. The cartridge has an external peripheral surface with a diameter corresponding to that of the bore of the bearing shell, and is inserted in this bore and then secured against rotation and axial translation with respect thereto by an abutment situated in the end region.

11 Claims, 9 Drawing Figures

U.S. Patent Oct. 14, 1986 Sheet 1 of 4 4,616,388
FIG_1
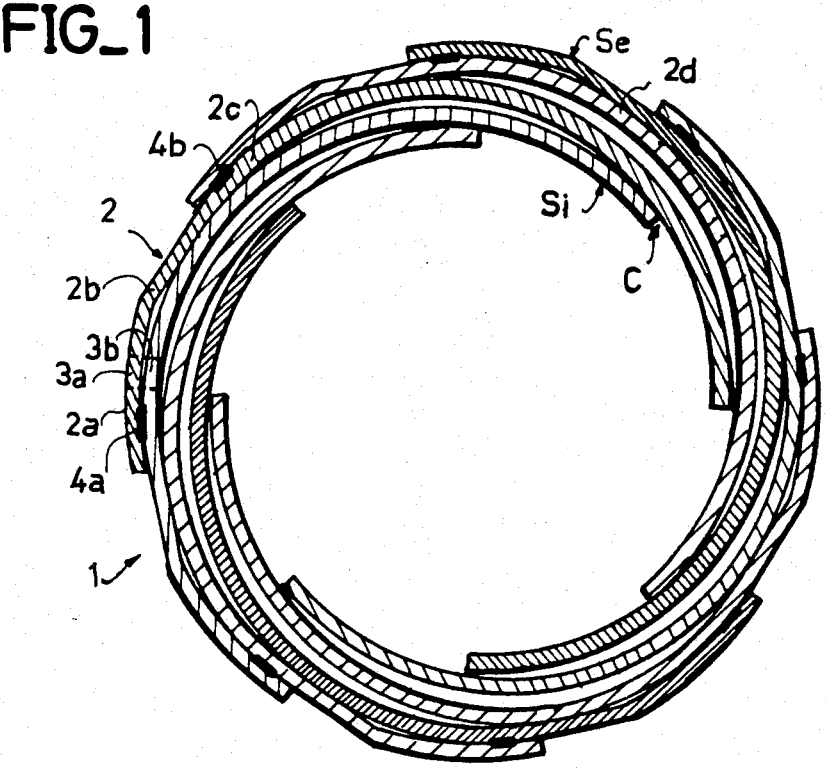
FIG_2
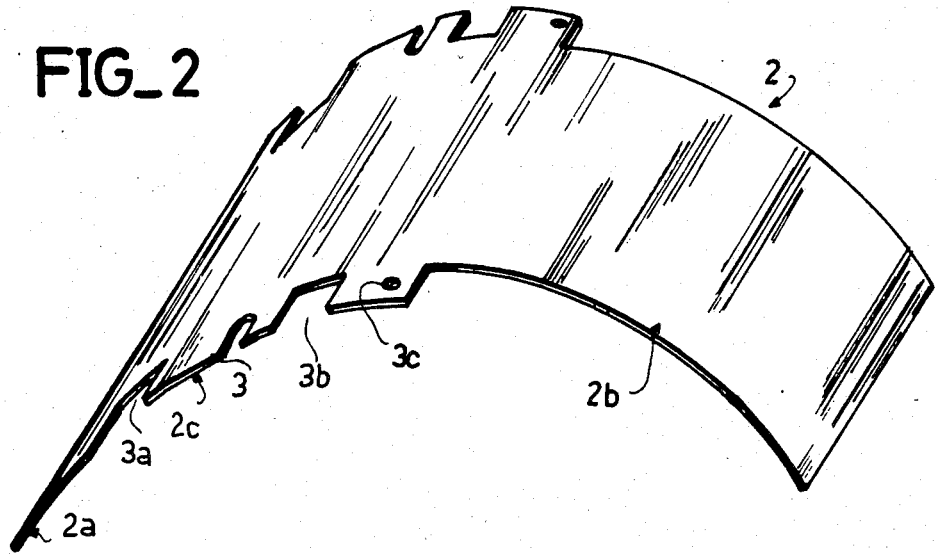

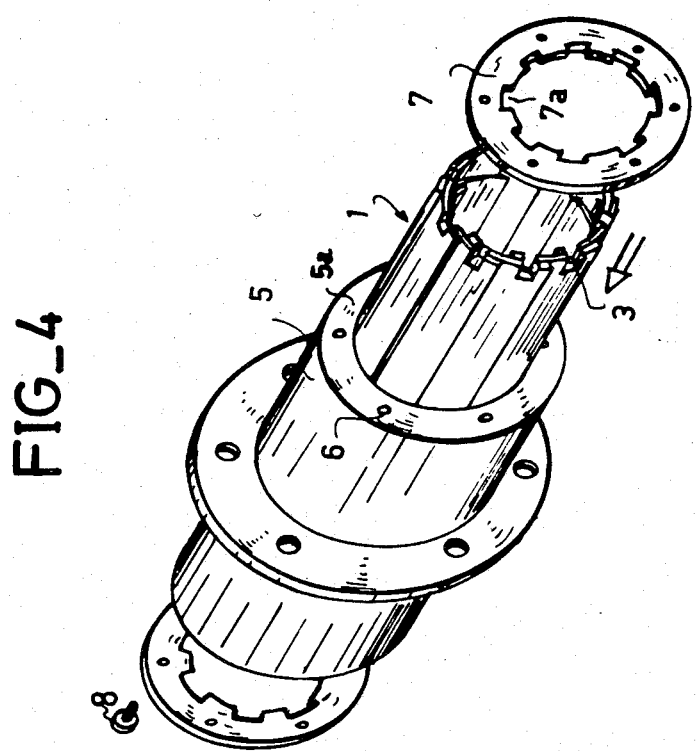
FIG._4
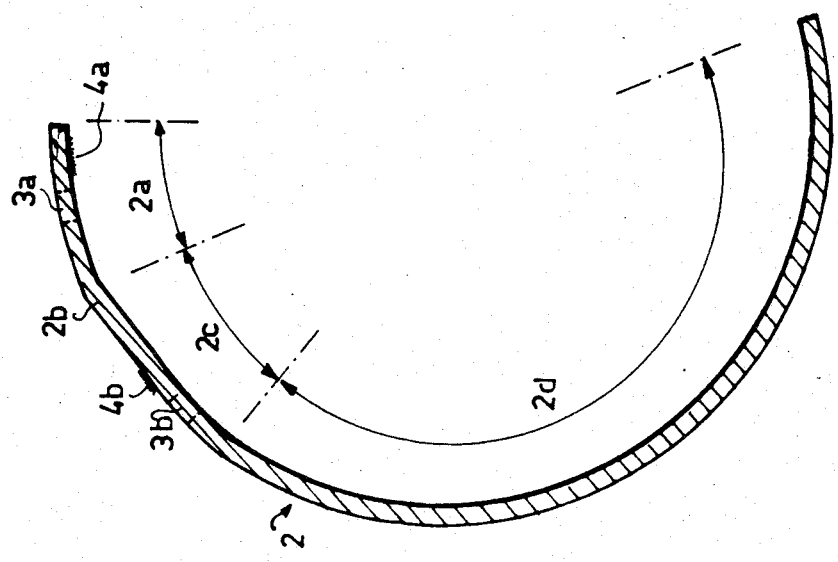
FIG._3

FIG_5
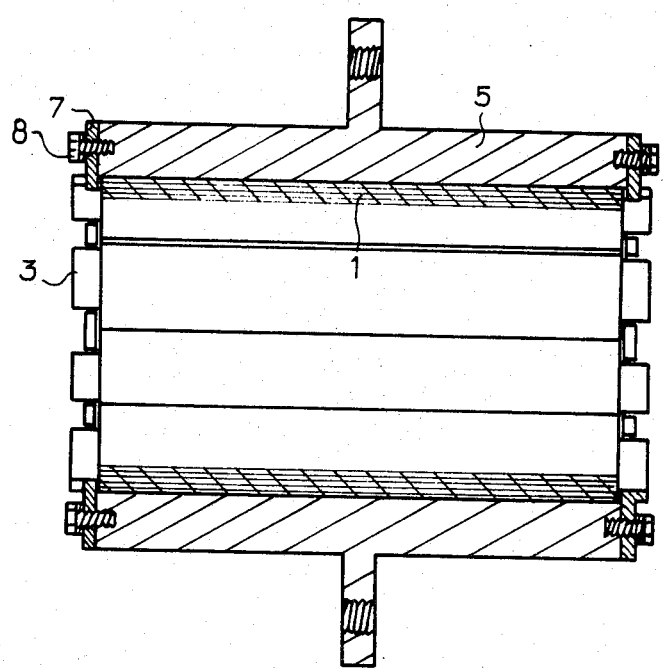
FIG_6
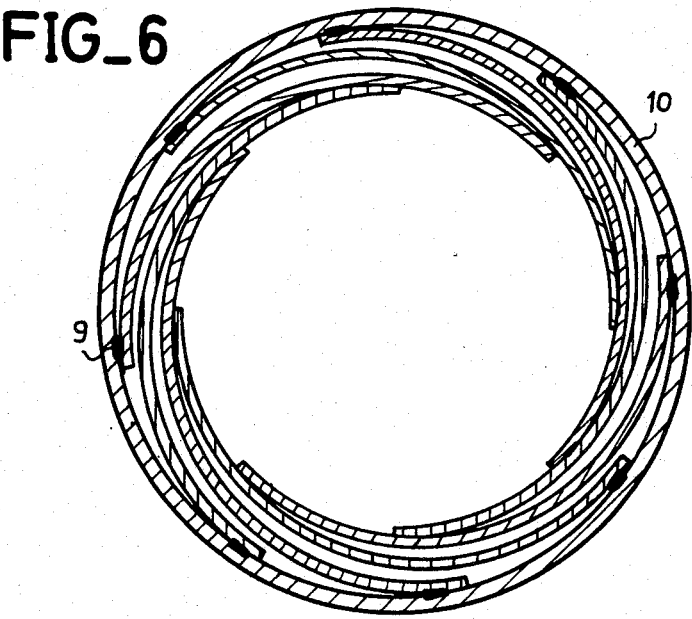

FIG_7-a
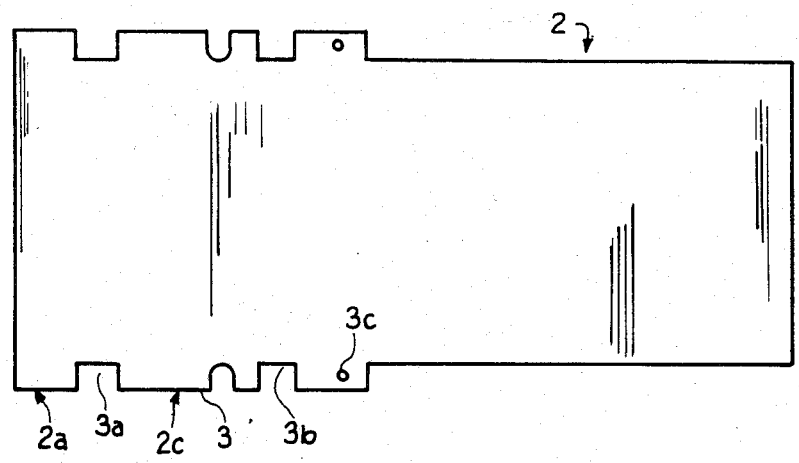
FIG_7-b
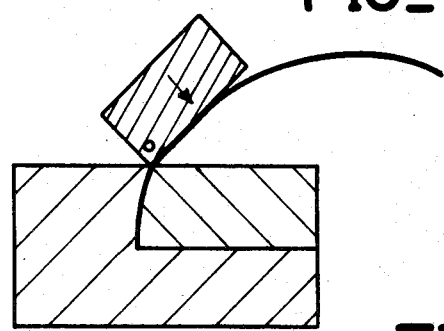
FIG_7-c
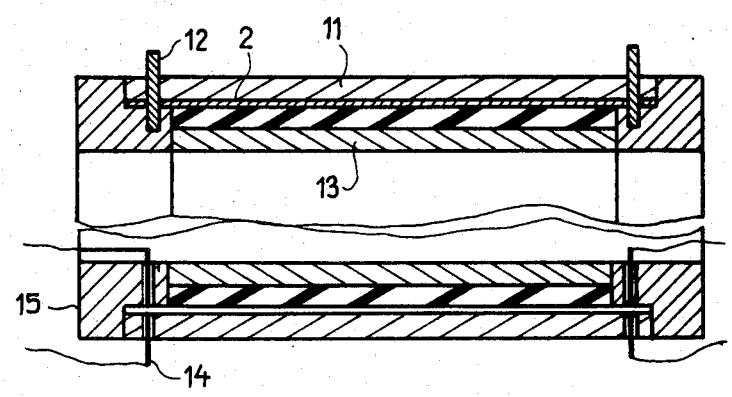

PROCESS FOR PRODUCING A HYDRODYNAMIC BEARING HAVING INTERNAL FOIL CARTRIDGE

BACKGROUND OF THE INVENTION

1. Field of the Invention

The invention relates to a process for producing hydrodynamic bearings for supporting and guiding rotary machine shafts, particularly shafts operating at high rotational speeds; the invention relates more particularly to the construction of bearings comprising thin foils conditioning the formation of a fluid film supporting the shaft when this latter is set in rotation. The invention extends to hydrodynamic bearings produced by using the process, as well as secondary assemblies designated further on by the term "self-contained cartridges", which, in accordance with the invention, are previously manufactured for producing the bearings.

By "hydrodynamic bearings" is meant not only bearings in which the support is obtained by a gas film but also those where it is obtained by a liquid film.

2. Description of the Prior Art

It is known that, in rotary high-speed machines, fluid film support or suspension bearings are advantageously used which avoid any contact between solid surfaces. Two essential types of bearings of this kind are known at present: hydrostatic bearings which have the defect of requiring a pressure source and hydrodynamic bearings in which the supporting fluid film is produced by rotation of the shaft and which present then the advantage of being self-contained. In this latter type of bearing, the foil bearings are the most widely known and are used in the majority of cases; they comprise a plurality of thin curved foils which are fixed inside the bore of a bearing shell, so as to partially overlap and form an internal floating surface forming a succession of "support corners" which generate the creation of the fluid film between the foils and the shaft when this latter reaches a sufficient rotational speed. Reference may be made for example to French Pat. No. 1 454 024 filed on Aug. 18th, 1965 for further details concerning these hydrodynamic foil bearings. In the known bearings of this type, the curved foils are generally made from thin metal sheet and are fixed individually inside the bearing shell by means of hollow structures such as grooves, furrows or calibrated holes which are machined in the shell so as to open into the internal surface thereof; each foil is provided with a preformed end having a shape adapted for fitting into the hollow structure which corresponds thereto and each of said foils is individually fixed in said hollow structure of the bearing shell by means of fixing members such as keys, pins, screws etc . . . .

This forming process presents serious drawbacks. Firstly, machining of the bearing shells and, to a lesser extent, the manufacture of the members for fixing each foil are relatively costly operations which very appreciably increase the cost of the bearings obtained. Moreover, this type of construction requires the use of bearing shells of great thickness so that the above-mentioned hollow structures may be machined therein and the members for fixing each foil housed therein.

Furthermore, the individual fitting of the foils into the bearing shell is an extremely delicate operation because of the high geometric precision required; such an operation, carried out either during a maintenance operation on the rotary machine concerned or during the assembly of this latter, requires qualified staff who must be sent on the site with special tools and who often meet with unfavorable working conditions, making these operations for adjusting the foils long and difficult to carry out. This drawback is particularly serious in the case of maintenance operations which become long and expensive when, at the end of their normal operating time, a number of bearings must be equipped with new thin foil.

In addition, the individual handling of each thin foil for assembly often causes deformation thereof or impairs their surface condition, which may be prejudicial to the correct formation of the supporting fluid film and so to correct operation of the bearing.

The present invention proposes a solution palliating the above-mentioned defects of hydrodynamic foil bearings.

SUMMARY OF THE INVENTION

An object of the invention is to provide a new process for producing hydrodynamic foil bearings which does away in particular with the need for machining the bearing shell so as to appreciably reduce the cost thereof.

Another object is to simplify considerably the operations for assembling and adjusting the foils in the bearing shell so as to facilitate the maintenance operations and to allow these operations to be carried out by unqualified staff without special tools.

Another object is to remove any risk of impairment or deformation of the foils during transport or handling.

Another object is to provide a process compatible with the use of a bearing shell of reduced thickness with respect to those used in the prior art, so as to economize on the weight and the space required for each bearing, which represents a very substantial advantage in some technical sectors and more especially in the aeronautic, automobile and cryogenic sectors.

The invention provides then a bearing of the type comprising in the bore of the bearing shell several thin curved foils partially overlapping so as to form an internal floating surface adapted to be disposed about the shaft and to condition, during rotation thereof, the formation of a floating film between said shaft and said surface. In accordance with the present invention, the process for producing such a bearing consists:

in manufacturing a self-contained cartridge for forming the internal functional assembly of the bearing, said cartridge being made from thin foils such as mentioned above, fixed to each other with overlapping parts, so as to form a self-contained assembly having, on the one hand, an internal floating surface of the above-mentioned type and, on the other hand, an external peripheral surface with a diameter corresponding to that of the bore of the bearing shell, in inserting said cartridge into the bore of the bearing shell, then in securing it against rotation and axial translation with respect thereto.

According to a first embodiment, the self-contained cartridge is manufactured by fixing the foils to one another, in particular by welding or brazing, each foil being fixed to the two adjacent foils by zones staggered along said foil.

According to another embodiment, the self-contained cartridge is manufactured by fixing the foils inside a thin jacket, in particular by welding or brazing, each foil being fixed in said jacket by its end situated on the outside.

Moreover, after insertion thereof into the shell of the bearing, the cartridge is preferably secured with respect to this latter by positioning in the border of the shell stop means integral with said shell and coming into axial and tangential abutment with mating means provided on the border of the cartridge.

Thus, the present invention leads to forming in a specialized workshop self-contained cartridges in which the foils are prepositioned with respect to each other, so that their internal part forms an appropriate floating surface and so that the external surface of said cartridge is adapted to the bearing shell to be equipped. Each cartridge once manufactured keeps its shape and its adjustments in the free condition and may be handled by its external surface without risk of deforming or impairing the internal floating surface which is protected. The positioning in the shell of the bearing is an extremely simple operation which consists in sliding the cartridge axially into the bore of the shell and in securing it against movement particularly by abutment means, these operations requiring no precaution or delicate adjustment. The cartridges may be removed and changed just as easily during maintenance operations which no longer require qualified staff or special tools.

Furthermore, the bore of the bearing shell may be smooth and the process of the invention does away with the traditional operations of machining the shell, which increase the price of the bearing obtained. It should be noted that the thickness of the shell may be studied for withstanding only the mechanical stresses which are applied thereto without requiring a minimum thickness allowing individual fixing of the foils inside same as in the case in the known technique.

The invention extends, by way of novel product, to the above-mentioned self-contained cartridges which are intended to form functional interchangeable hydrodynamic bearing assemblies, these cartridges being formed of several foils, fixed with overlapping parts, either on each other or within a thin jacket.

Finally, the invention extends to the hydrodynamic bearings obtained by using the above-defined process, said bearings each comprising a bearing shell having a bore of a diameter slightly greater than that of the shaft which it is to support and in which is disposed a self-contained cartridge of the above-mentioned type which is held in place against axial translation and rotation within said bore.

BRIEF DESCRIPTION OF THE DRAWINGS

With the invention thus outlined in its general form, other features will be clear from the following description with reference to the accompanying drawings, which present by way of non limiting examples embodiments of the invention: in these drawings which form an integral part of the present description:

FIG. 1 is a cross section of a self-contained cartridge according to the invention;

FIGS. 2 and 3 are enlarged schematical views of one of the thin foils forming said cartridge, shown respectively in perspective and in cross section;

FIG. 4 illustrates the construction of a hydrodynamic bearing from a cartridge such as shown in FIG. 1;

FIG. 5 shows in longitudinal axial section the hydrodynamic bearing formed;

FIG. 6 shows in cross section another self-contained cartridge embodiment;

FIGS. 7a, 7b and 7c show schematically, by way of illustration, phases during manufacture of the cartridge shown in FIG. 1.

DESCRIPTION OF THE PREFERRED EMBODIMENTS

The self-contained cartridge 1 shown by way of example in FIG. 1 is manufactured in a specialized workshop from several thin curved foils (eight in number in the example) of the type shown schematically at 2 in FIGS. 2 and 3.

Each foil 2, made from thin metal sheet, comprises over its length an end heel portion 2a, a slight set-back 2b followed by a portion 2c, called internal securing portion and a functional part 2d which extends the internal securing portion 2c.

Each foil is cut out so that its end heel portion 2a and its internal securing portion 2c are slightly wider than its functional part 2d, these internal and heel portions thus having side margins 3.

These margins are formed with notches such as 3a and 3b for securing the cartridge 1 against movement in the bearing shell. In the example two notches have been formed in each margin 3, in positions adapted so that the notch 3a of one foil is superposed with the notch 3b of the underlying foil.

Moreover, the margins 3 of each foil comprise positioning holes such as 3c which, as will be seen further on, serve for positioning the foils with respect to each other during manufacture of cartridge 1. (In the example, indentations 3d are also formed in margins 3 at positions adapted so that the indentation 3d of one foil is superimposed with the hole 3c of the underlying foil and thus allows access to this hole).

The different foils 2 of the cartridge are welded to one another by spot welding such as shown schematically at 4a and 4b in FIG. 1; each foil 2 being thus secured, on the one hand, at 4a by its end heel portion 2a to the underlying foil and, on the other hand, at 4b by its internal securing portion 2c to the overlying foil. In the example, the spot-welds are formed in the margins 3 of the foils.

The above-described cartridge forms a self-contained assembly in which the foils have a precise position with respect to each other: when said foils are thus positioned, their external heel portion 2a forms an external peripheral surface Se (discontinuous in the example) whose diameter is equal to the diameter of the bore of the bearing shell, whereas their functional part 2d (of smaller diameter) forms an internal floating surface Si with a diameter corresponding to that of the shaft and a shape adapted to cause the desired hydrodynamic effect (creation of "support corners" in the zones C situated at the boundary of two foils).

It should be noted that the functional part of the foils which forms the internal floating surface Si is protected inside the cartridge, this latter being able to be handled by its periphery without any contact with the internal surface Si which removes any risk of impairing or deforming same.

The construction of a bearing from such a cartridge is an extremely simple operation, shown schematically in FIG. 4. The bearing shell 5 used has an internal smooth bore and is simply provided on both its endmost edges 5a, with blind tapped holes such as 6.

The cartridge for fitting to shell 5 has been formed from the dimensional point of view so that the width of the functional parts 2d is equal to the length of the shell and so that the diameter of its external surface Se is equal to that of the bore of said shell (sliding fit). Said cartridge is inserted into this bore by axial thrust, until it is disposed inside the shell with only its notched margins 3 projecting from each side thereof.

Then the cartridge is secured against movement by means of two ring-shaped washers such as 7, which have a set of internal notches 7a matching the notches of the cartridge, these two sets of notches fitting into each other. Screws such as 8 secure the washers 7 to the endmost edges of the bearing shell 5.

These operations require no special tools and may be carried out without special precautions by unqualified staff.

The bearing thus formed is shown schematically in section in FIG. 5. Replacing one cartridge by another forms a maintenance operation which becomes extremely simple and comprises no risk of defective adjustment of the foils, since the cartridge has been previously correctly manufactured in a specialized workshop. It should be noted that the bearing shell 5 requires no special machining.

Moreover, FIG. 6 shows schematically a self-contained cartridge variant in accordance with the invention. In this variant, the foils no longer have an external heel portion as before: they are welded by spot-welding 9 (at the level of their internal securing portion) to a thin jacket 10 whose external diameter is equal to that of the bore of the bearing shell (sliding fit). As before, the cartridge is provided with notches in its border, which in this case are preferably formed on the edges of the jacket 10, the foils having a constant width slightly smaller than that of the jacket: it is then this latter which projects from each side of the shell and serves for securing the cartridge against rotation and translation in the same way as before.

The manufacture of the self-contained cartridges in accordance with the invention may be carried out by different procedures, the foils, if need be, being able to be fixed together or to the jacket by means other than spot-welding as mentioned (brazing, edge-welding, continuous or discontinuous welding, welding using electronic bombardment, laser or plasma welding, friction, induction or diffusion welding . . . ).

It is also possible to assemble the foils by means of a connection other than the welded connection (riveting, stapling, bonding, crimping, rolling . . . ).

Purely by way of illustration, FIGS. 7a, 7b and 7c show schematically three phases for manufacturing a cartridge such as shown in FIG. 1.

After heat treatment of the metal sheets conferring on them an appropriate hardness, they are cut out according to the adapted evolute shown in FIG. 1. This cutting out may be achieved by any known process: chemical cutting, machining, laser or oxyacetylene cutting, cutting by electronic bombardment etc . . . .

Then the foils are shaped by individually curving each one of them so that their end heel portion has a circular profile with a radius equal to or slightly less than the radius of the bore of the bearing shell and so that, after a slight set-back, their internal securing portion and their functional part have a circular profile with a radius less than the preceding one, adapted for obtaining the hydrodynamic effect.

This shaping operation may be provided in a single pass by stamping, electroforming, magnetoforming, or hydroforming. It may also be carried out in two steps, the first by shaping with a roller, and the other (shown in FIG. 7b) by bending so as to obtain the set-back. This bending is carried out with a tool which holds the floating part of the foil and comprises a mobile bending part.

The foils thus shaped are then mounted in a tool for positioning them with respect to each other and welding them in this position. This tool shown schematically in section in FIG. 7c comprises a hollow sleeve 11 having an internal diameter equal to that of the bore of the bearing shell. The foils 2 are positioned in this sleeve, angularly and axially, by means of removable pins 12 which are introduced into holes in the sleeve so as to penetrate into the positioning holes 3c of the foils. An expandable mandrel 13 (comprising in the example an internal former and a thickness of flexible material) is then introduced inside sleeve 11 so as to force the foils 2 against the internal bore of this latter and to confer on the foils the shapes and positions which they will have in the cartridge.

Welding of the foils in this position is effected by means of electrodes such as 14 which pass through holes formed in sleeve 11 and through internal guides 15 disposed in the edge region.

Once the spot-welding has been carried out, pins 12, mandrel 13 and guides 15 are withdrawn and the cartridge is removed from the sleeve by an axial thrust.

Of course, the above operations are only given by way of example to illustrate one method of manufacturing the cartridges among others, the invention being in no wise limited to the terms of the preceding description but comprising on the contrary all the variations thereof. It should be noted that the means for securing the cartridge in the bearing shell may have any other from than the ones described; in particular, this securing may in some applications be obtained by friction of the external surface of the cartridge against the internal surface of the bearing shell.

The invention is applicable in all rotary machines, more especially when the speeds of rotation are high: turbo machine (compressors, turbines, fans), high speed machining reamer, high speed electric motors, centrifugal machine etc . . . . It extends not only to cylindrical bearings but also to taper bearings.

We claim:

1. A process for producing a hydrodynamic bearing for supporting and guiding a rotary machine shaft, said bearing being of the type comprising, in the bore of a bearing shell, several thin curved foils partially overlapping so as to form an internal floating surface and which cause, during rotation thereof, the formation of a fluid film between said shaft and said surface, said process consisting of:

manufacturing a self contained cartridge thus forming the internal functional assembly of the bearing, said cartridge being formed from thin foils each fixed to its two next adjacent foils at locations staggered along said foils at overlapping parts thereof, so as to form a self-contained assembly having an internal floating surface and, an external peripheral surface of the self-contained cartridge formed by the outermost foil areas which has a diameter corresponding to that of the bore of the bearing shell, inserting said cartridge into the bore of the bearing shell, then securing it against rotation and axial translation with respect thereto.

2. The process as claimed in claim 1, wherein said self-contained cartridge is manufactured by fixing the foils inside a thin jacket, each foil being fixed in said jacket by its outwardly situated end.

3. The process of claim 1, wherein the foils are fixed by welding or brazing.

4. The process as claimed in one of claims 1, 2 or 3, wherein, after insertion in the bearing shell, the cartridge is secured against movement with respect thereto, by forming in the edge region of the shell abutment means integral with said shell and coming into axial and tangential engagement with mating means provided in the edge region of the cartridge.

5. The process as claimed in claim 4, wherein the cartridge is formed so as to have notches along its two edges, securing of said cartridge against movement being provided, after insertion thereof into the bearing shell, by fixing on each endmost edge of said shell a ring-shaped washer having internal notches interfitting with the corresponding notches of the cartridge.

6. The process as claimed in claim 1, wherein the self-contained cartridge is formed by cutting out several foils from flat metal sheet according to an appropriate evolute, curving each one of them individually so as to confer thereon an appropriate shape, fitting said foils into a positioning tool so as to dispose them in adapted positions partially superimposed on each other and fixing said foils to each other by their endmost outwardly situated portions.

7. The process as claimed in claim 6, wherein:

each foil is formed so as to comprise an end heel portion of circular profile with a radius equal to or slightly less than the radius of the bore of the bearing shell, a slight set-back followed by an internal securing portion of circular profile with a radius less than the preceding one and a functional part extending the internal portion and having the same profile, the foils are held by the positioning tool so that their end heel portion is curved to the radius of the bore of the bearing shell and so that their internal securing portion comes into engagement with the end heel portion of the overlying foil, said foils are fixed to each other in the tool, each foil being fixed, on the one hand, by its end heel portion to the underlying foil and, on the other hand, by its internal securing portion to the overlying foil.

8. The process as claimed in claim 8, wherein the foils are fixed to each other by spot-welding at their end heel portion and their internal securing portion.

9. The process as claimed in claim 7, wherein the cartridge is formed so as to have notches along its two edges, securing of said cartridge against movement being provided, after insertion thereof into the bearing shell by fixing on each endmost edge of said shell a ring-shaped washer having internal notches interfitting with the corresponding notches of the cartridge, and wherein each foil is cut out so that its end heel portion and its internal fixing portion are slightly wider than its functional part, so as to provide these heel and internal portions with side margins, said sets of notches being formed in said margins.

10. The process as claimed in claim 9, wherein the foils are fixed to each other by spot welding at their heel portion and their internal securing portion, and wherein said spot-welding is provided in the side margins of the heel and internal portions of each foil.

11. The process of claim 2 wherein the foils are fixed by welding or brazing.

* * * * *